(12) United States Patent
Van Damme et al.

(10) Patent No.: US 11,010,049 B2
(45) Date of Patent: *May 18, 2021

(54) SYSTEM AND METHOD TO PERFORM A NUMERICAL INPUT USING A CONTINUOUS SWIPE GESTURE

(71) Applicant: THE TORONTO-DOMINION BANK, Toronto (CA)

(72) Inventors: Edwin Van Damme, Toronto (CA); Perry Aaron Jones Haldenby, Toronto (CA); Paul Mon-Wah Chan, Markham (CA); John Jong-Suk Lee, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,341

(22) Filed: Mar. 30, 2020

(65) Prior Publication Data
US 2020/0225845 A1     Jul. 16, 2020

Related U.S. Application Data

(63) Continuation of application No. 15/689,513, filed on Aug. 29, 2017, now Pat. No. 10,642,482, which is a
(Continued)

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 3/0486* (2013.01); *G06F 3/04847* (2013.01);
(Continued)

(58) Field of Classification Search
CPC .. G06F 3/04883; G06F 3/0488; G06F 3/0482; G06Q 20/10; G06Q 20/20;
(Continued)

(56) References Cited

U.S. PATENT DOCUMENTS 7,636,683 B1 *  12/2009  Mills ............... G06Q 20/40
                                                  705/37
8,364,590 B1   1/2013  Casey et al.
(Continued)

OTHER PUBLICATIONS

Xoom Money Transfer; Xoom-Paypal service; https://play.google.com/store/apps/details?id=com.xoom.android.app&hl=en; 2016; 3 pages.
(Continued)

*Primary Examiner* — Quoc A Tran

(57) ABSTRACT

There is provided a gesture-based GUI (system, method, etc.) to facilitate input of numerical data using a continuous swipe gesture. A gesture-based I/O device displays a GUI presenting a gross number and a gross number control to initially define a specific number for further defining with specificity. In response to a first gesture (hard click or pause) interacting with the gross number control, the specific number is initially defined as the gross number and a finer number control is presented to refine the specific number. In response to a continuous swipe gesture continuing from the first gesture and interacting with the finer number control, the interface further defines the specific number with finer specificity where a quantum varies in response to a direction and distance of the continuous swipe. Successive finer number controls may be also be presented to refine the specific number by continuing the swipe.

25 Claims, 12 Drawing Sheets

Related U.S. Application Data continuation-in-part of application No. 15/267,930, filed on Sep. 16, 2016, now Pat. No. 10,540,075.

(51) Int. Cl.

| | |
|---|---|
| *G06F 3/0486* | (2013.01) |
| *G06Q 20/32* | (2012.01) |
| *G06Q 10/10* | (2012.01) |
| *G06Q 20/02* | (2012.01) |
| *G06F 3/0482* | (2013.01) |
| *G06Q 20/40* | (2012.01) |
| *G06Q 20/38* | (2012.01) |
| *G06Q 20/20* | (2012.01) |
| *G06F 17/00* | (2019.01) |

(52) U.S. Cl.
CPC ............ *G06F 3/0482* (2013.01); *G06Q 10/10* (2013.01); *G06Q 20/02* (2013.01); *G06Q 20/20* (2013.01); *G06Q 20/32* (2013.01); *G06Q 20/3221* (2013.01); *G06Q 20/381* (2013.01); *G06Q 20/40* (2013.01)

(58) Field of Classification Search
CPC ........ G06Q 20/40; G06Q 20/32; G06Q 20/02; G06Q 20/381; G06Q 20/3221
See application file for complete search history.

(56) References Cited

U.S. PATENT DOCUMENTS

| | | |
|---|---|---|
| 2010/0042535 A1 | 2/2010 | Stone |
| 2011/0202414 A1 | 8/2011 | Nallasivan et al. |
| 2012/0174043 A1* | 7/2012 | Queru ................... G06F 3/0236 715/863 |
| 2013/0085941 A1 | 4/2013 | Rosenblatt et al. |
| 2013/0268422 A1 | 10/2013 | Ram et al. |
| 2014/0279415 A1* | 9/2014 | Hazam ................... G06Q 20/10 705/39 |
| 2015/0019420 A1 | 1/2015 | Low et al. |

OTHER PUBLICATIONS

Chillr-Money Transfer and Recharge; https://play.google.com/store/apps/details?id=in.chillr&hl=en; 2016; 3 pages.

* cited by examiner

SYSTEM AND METHOD TO PERFORM A NUMERICAL INPUT USING A CONTINUOUS SWIPE GESTURE

CROSS REFERENCE

This application is a continuation of U.S. patent application Ser. No. 15/689,513 filed Aug. 29, 2017 and entitled, "System and Method to Perform a Numerical Input Using a Continuous Swipe Gesture", (the "'513 application") which is incorporated herein by reference. The '513 application is a continuation in part of U.S. patent application Ser. No. 15/267,930 filed Sep. 16, 2016 and entitled "System and Method to Perform an Allocation using a Continuous Two Direction Swipe Gesture", now U.S. patent Ser. No. 10/540,075, which is incorporated herein by reference. This '513 application claims the benefit of U.S. Provisional Application No. 62/409,565 filed Oct. 18, 2016 and entitled "Granular Selection Graphical User Interface Method and System", which is incorporated herein by reference.

FIELD

The present disclosure relates to gesture-based computer interfaces and more particularly to a system and method to perform a numerical input using a continuous swipe gesture.

BACKGROUND

Graphical user interfaces (GUIs) for functions and applications for computer and other devices enable users to receive information and provide input, for example, to invoke a function, feature or service. Graphical user interfaces can play a significant role in the user experience and satisfaction in dealing with the associated device. Complicated user interfaces may result in erroneous user input. Such input may waste computer or other resources through unnecessary action while performing or partially performing undesired functions, features or services or in correcting the input. As well, some GUIs are more resource intensive than others, using computer resources unnecessarily.

By way of example, inputting numerical data, particularly data that may not be from a small subset of numbers, is cumbersome, requiring typing of specific digits or choosing the number using a picker interface to select the desired number. Typing may introduce typing errors and occasions processing for each digit. On a touch screen this includes sensing the interaction with the screen to determine location, determining the associated number, etc. as well as any error correction for typos. Selection using a picker is awkward if there are many values that the numerical input may take. Often a user most repeatedly scroll (e.g. a picker wheel) to or adjacent to the desired number and then select the specific number. Again multiple separate touches may be occasioned.

SUMMARY

There is provided a gesture-based GUI (system, method, etc.) to facilitate input of numerical data using a continuous swipe gesture. A gesture-based I/O device displays a GUI presenting a gross number and a gross number control to initially define a specific number for further defining with specificity. In response to a first gesture (hard click or pause) interacting with the gross number control, the specific number is initially defined as the gross number and a finer number control is presented to refine the specific number. In response to a continuous swipe gesture continuing from the first gesture and interacting with the finer number control, the interface further defines the specific number with finer specificity where a quantum varies in response to a direction and distance of the continuous swipe. Successive finer number controls may be also be presented to refine the specific number by continuing the swipe.

In accordance with one aspect, there is provided a computing device having a processor coupled to a memory and coupled to a gesture based I/O device, the memory storing instructions, which when executed by the processor configure the computing device to: display via the gesture based I/O device a graphical user interface (GUI) having a region displaying a gross number and a gross number control with which to initially define a specific number for further defining with finer specificity; in response to a first gesture interacting with the gross number control, the first gesture comprising a hard click or a pause gesture via the gesture based I/O device, initially define the specific number as the gross number and display a finer number control to further define the specific number with finer specificity; and, in response to a continuous swipe gesture continuing from the first gesture and interacting with the finer number control, further display and define the specific number with finer specificity, a quantum of the specific number varying in response to a direction and distance of the continuous swipe gesture. The finer number control may be responsive to a second hard click or pause gesture via the gesture based I/O device interacting with the finer number control to display a further finer granular number control to further define the specific number with further finer specificity; and wherein the computing device is further configured to: in response to a continuation of the continuous swipe gesture from the second gesture and interacting with the further finer number control, further display and define the specific number with further finer specificity, the quantum of the specific number varying in response to a direction and distance of the continuous swipe gesture. The further finer number control may be responsive to a third hard click or pause gesture via the gesture based I/O device to set the specific number.

The finer number control may be configured to adjust the specific number between an upper number and a lower number relative to the gross number. The finer number control may include a slider control interface to adjust the specific number between a lower limit at one end of the slider control and an upper limit at an opposite end of the slider control. The slider control interface may comprise a graphical element displayed in association with the lower limit and upper limit to visually guide the continuous swipe gesture.

The graphical user interface may be configured with a gestural control to receive a swipe input moving the specific number to a receiving control which receives the specific number to assist with a completion of a GUI form. The swipe input may be a component of the continuous swipe gesture.

There is provided a computing device having a processor coupled to a memory and coupled to a gesture based I/O device, the memory storing instructions, which when executed by the processor configure the computing device to: display via the gesture based I/O device a graphical user interface (GUI) having an number region displaying a gross number and a gross number control with which to initially define a specific number for further defining with finer specificity; and in response to a first gesture interacting with the gross number control, the first gesture comprising a hard click or a pause gesture via the gesture based I/O device:

initially define the specific number as the gross number; and successively display respective finer number controls to further define the specific number with respective finer specificity in response to a continuous swipe gesture continuing the first gesture, where: a next of the respective finer number controls is displayed in response to a respective hard click or pause gesture interacting with a one of the respective finer number controls as currently displayed; and each of the respective finer number controls refines the specificity of the specific number in response to a direction and distance of the continuous swipe interacting with the respective finer number control.

Each respective finer number control may include a slider control interface to adjust the specific number between a lower limit at one end of the slider control interface and an upper limit at an opposite end of the slider control interface.

Each respective hard click or pause gesture is a component of the continuous swipe gesture to continually interact with the gesture based I/O device to define the specific number.

The specificity of the specific number to be defined may be to at least to the/100 (one hundredths) decimal place.

The graphical user interface may be further configured with a gestural control to receive a swipe gesture input to move the specific number to a receiving control which receives the specific number to assist with a completion of a GUI form. The GUI form may be a transaction form. The swipe gesture input may be a component of the continuous swipe gesture.

Method aspects are also disclosed for each device aspect, among others. A computer program product aspect is also disclosed. The computer program product comprises a non-transitory computer readable medium that stores instructions that, when executed by a processor of a computing device having a gesture based I/O device, configure the computing device to perform a method according to any one of the method aspects.

DETAILED DESCRIPTION

As noted, some GUIs are more resource intensive than others, using computer resources unnecessarily. By way of example, effective money movement is an important aspect of the services provided by financial institutions. Most GUIs for money movement require the interaction with several GUI elements and do not provide a seamless interaction which can make the process of money movement difficult to use. Typically systems require at a minimum four distinct interactions with at least three distinct interaction elements: 1. Source Account, 2. Destination account, 3. transfer amount, 4. confirmation where 1 & 2 are drop down menus, 3 is a text box, 4 is a button. These interactions are significant obstacles in accomplishing the intended goal of moving money.

Figure 1:
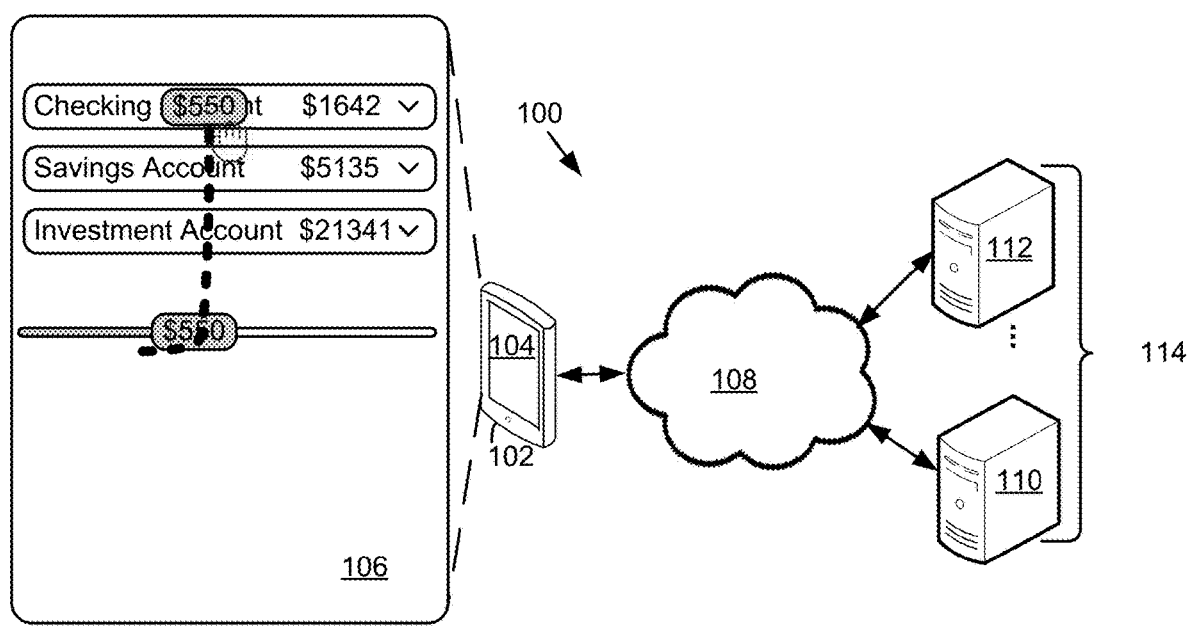
FIG. 1 is a diagram illustrating an example computing device communicating in a communication network and configured to output for display a graphical user interface via a gesture-based input/output (I/O) device, in accordance with one or more aspects of the present disclosure.

FIG. 1 is a diagram illustrating an example computer network 100 in which an example computing device 102 is configured to display, via a gesture-based I/O device 104, a graphical user interface (GUI) 106, in accordance with one or more aspects of the present disclosure. The computing device 102 is communicating using one or more communication networks 108 with one or more other computing devices (e.g. 110 and 112 and collectively 114). Computing device 102, using GUI 106, may receive input to determine an allocation amount, allocation source and allocation destination and generate and output a signal to provide allocation information to one or more of the other computing devices 114 to perform an allocation. An allocation may comprise any of a variety of transactions such as a financial transaction, bill payment, money transfers, stock purchases or sales, asset purchases or sales transfers, currency conversions, etc.

In the example of FIG. 1, computing device 102 is a mobile phone. Other examples of computing device 102 may be a tablet computer, a personal digital assistant (PDA), a laptop computer, a tabletop computer, a portable gaming device, a portable media player, an e-book reader, a watch, or another type of computing device. In the example of FIG. 1, other computing devices 114 are servers. While allocations are typically performed by servers, other types of computing devices may be utilized such as mainframes, and other higher performance computing devices, etc.; however, allocations may be performed on personal computers, workstations, laptops, etc. Each of these is an example of a computing device having at least one processing device and memory.

It will be understood that computing device 102 may not communicate directly with the computing device performing the allocation per se but may communicate with a server configured to receive and initially handle requests from a mobile device (e.g. a mobile processing server), a Web server or other type of server. To complete a transaction, such as a mobile payment, computing device 102 may communicate with more than one server. Other configurations are also known to those skilled in the art.

Computing device 102 is coupled for communication to a wide area network (WAN) 108 such as the Internet. Network 108 is coupled for communication with a plurality of computing devices (e.g. servers 110 and 112). It is understood that representative communication network 100 is simplified for illustrative purposes. Additional networks may also be coupled to network 108 such as a wireless network between WAN 108 and computing device 102 (not shown).

Although the present disclosure illustrates and discusses a gesture-based I/O device 104 primarily in the form of a screen device with IO capabilities (e.g. touchscreen), other examples of gesture-based I/O devices may be utilized which may detect movement and which may not comprise a screen per se. Computing device 102 may receive gesture-based input from a track pad/touch pad, one or more cameras, or another presence or gesture sensitive input device, where presence means presence aspects of a user including for example motion of all or part of the user.

Computing device 102 may generate output for display on the screen device or in some examples, for display by a projector, monitor or other display device. It will be understood that gesture-based I/O device 104 as a screen device may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology: and in relation to output capabilities: a liquid crystal display (LCD), light emitting diode (LED) display, organic light-emitting diode (OLED) display, dot matrix display, e-ink, or similar monochrome or color display).

Gesture-based I/O device 104 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 104. Gesture-based I/O device 104 and may also include non-tap gestures. Gesture-based I/O device 104 may output or display information, such as a graphical user interface (106), to a user. The gesture-based I/O device 104 may present various applications, functions and capabilities of the computing device 102 including, for example, messaging applications, telephone communications, contact and calendar applications, Web browsing applications, game applications, e-book applications and financial, payment and other transaction applications or functions among others.

Servers 114 may be configured to perform one or more types of allocations (a type of transaction) as instructed by computing device 102. The allocations may relate to an account of a user of computing device 102 held with a financial service provider for example. Servers 114 may store account data, which may include account identification information identifying one or more accounts of customers of the financial service provider (e.g., a business entity associated with servers 114). In one example, account identification information may include financial service account information. For example, such financial service account information may include a checking account, a savings account, a revolving credit line, an account linked to a credit or debit card, a brokerage account, and any additional or alternate account provided or supported by the financial service provider (e.g., an issuing bank or financial institution). In other embodiments, account data may include information identifying investment portfolios held by one or more customers of the financial service provider. Servers 114 may store transaction data may include information identifying one or more transactions involving one or more customers or accounts of a financial service provider. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial service provider or other entity.

Figure 2:
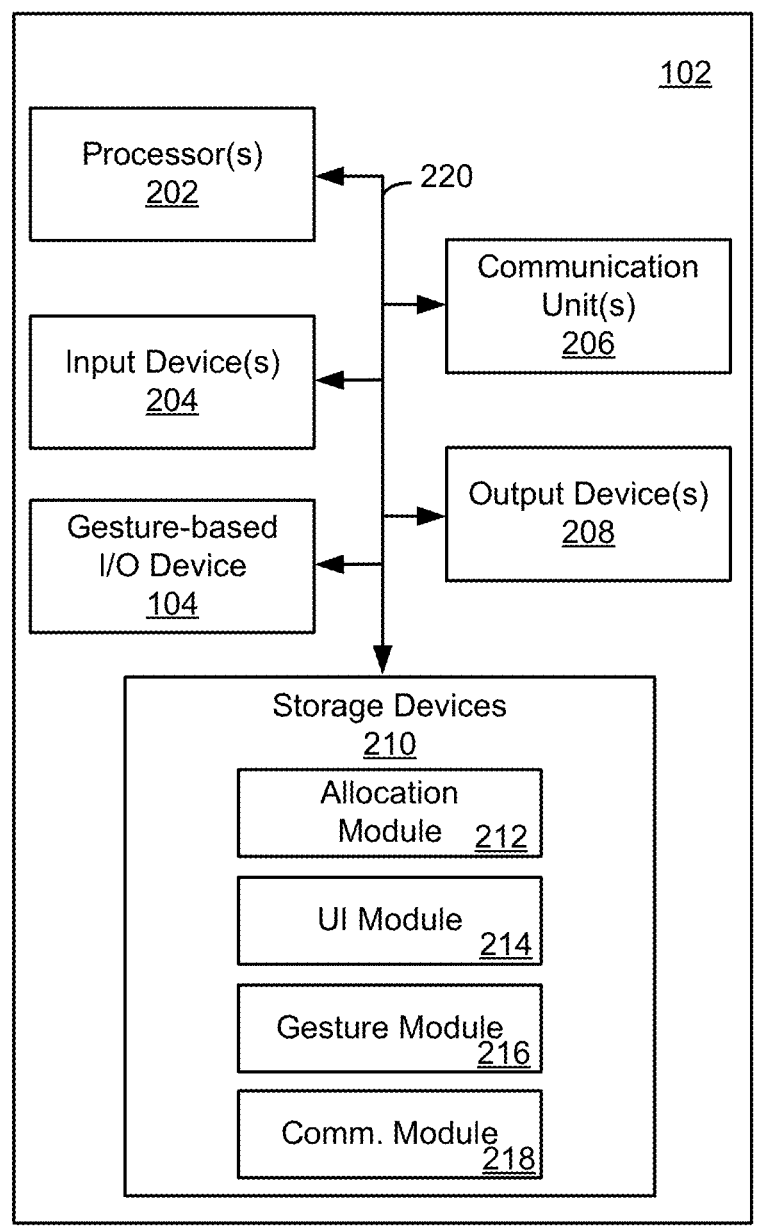
FIG. 2 is a diagram illustrating an example computing device, in accordance with one or more aspects of the present disclosure.

FIG. 2 is a diagram illustrating in block form an example computing device (e.g. 102), in accordance with one or more aspects of the present disclosure, for example, to provide a system and perform a method to complete an allocation. Computing device 102 comprises one or more processors 202, one or more input devices 204, gesture-based I/O device 104, one or more communication units 206 and one or more output devices 208. Computing device 102 also includes one or more storage devices 210 storing one or more modules such as allocation module 212, UI module 214, gesture module 216 and communication module 218. Communication channels 220 may couple each of the components 104, 202, 204, 206, 208, 210, 212, 214, 216 and 218 for inter-component communications, whether communicatively, physically and/or operatively. In some examples, communication channels 220 may include a system bus, a network connection, an inter-process communication data structure, or any other method for communicating data.

One or more processors 202 may implement functionality and/or execute instructions within computing device 102. For example, processors 202 may be configured to receive instructions and/or data from storage devices 210 to execute the functionality of the modules shown in FIG. 2, among others (e.g. operating system, applications, etc.) Computing device 102 may store data/information to storage devices 210. Some of the functionality is described further herein below.

One or more communication units 206 may communicate with external devices such as servers 110 and 112, etc. via one or more networks (e.g. 108) by transmitting and/or receiving network signals on the one or more networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 220).

The one or more storage devices 210 may store instructions and/or data for processing during operation of computing device 102. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Allocation module 212 may be configured to obtain allocation information to instruct the performance of an allocation such has on behalf of the user. Allocation module 212 may cooperate with UI module 214 and gesture module 216 to present a user interface and receive gesture input via gesture-based I/O device 104. Certain information to present in the user interface may be obtained from servers 110 or 112 for example, looking up data stored on behalf of a user instructing the allocation.

Allocation information may be determined at least in part by the user input and communicated to at least one of the servers 110, 112 to perform the allocation. In one example, the allocation may be a money transfer, transferring an amount of money from a source account (e.g. checking account) to a destination account (such as a saving account). In one example, allocation module 212 may comprise an application (whether native or browser-based) from a financial service provider where the user has one or more accounts. Allocation module 212 may also be configured to provide functionality to transfer money to other accounts or destinations such as a credit card, investment account, mortgage, bill payment, another individual, to perform investment sales or purchases, to perform currency purchases, etc. For security reasons and for data currency reasons, it may be preferred to store certain allocation information (e.g. user accounts held at a financial service provider) and other related information (e.g. account balances, personal information, etc.) remotely in respective of computer device 102, obtaining such information just prior to instructing an allocation, such as after a secure sign-on operation on start-up of allocation module 212 or after a period of inactivity. Allocation information and other related information may be only stored temporarily on computing device 102.

Gesture module 216 may receive input from gesture-based I/O device 104 entered via the touchscreen, processing same for communication with allocation module 212 and/or UI module 214 and/or others not shown. In some configurations, the gesture module 216 may be a component of an operating system. In response to input detected by gesture-based I/O device 104, gesture module 216 may receive information for processing. The information may be aggregated or grouped to generate one or more touch or gesture events. The events may include data representing a location on gesture-based I/O device 104 where the input is received, a time when the input or part thereof is received at the location, and/or a direction component (e.g. push down, pull up, lateral motion). The touch events may be communicated to the allocation module 212 and/or UI module 214 for further processing.

Allocation module 212 and/or UI module 214 may use the data associated with the one or more touch events to determine a response. In one example, allocation module 212 may, based on the location components of these touch events, increase or decrease an allocation amount and may invoke UI module 214 to modify the GUI for output via gesture-based I/O device 104 to reflect the change in the amount. Allocation module 212 may generate a signal comprising allocation information to instruct the performance of the allocation and communicate (e.g. via communication module 218) the signal such as to one or more of servers 114. It will be understood that a swipe operation requires a continuous interaction with the interface elements of the device and the device can provide the user with interaction references to allow for easier targeting for the user. This is not the case for tap-based interfaces. These require the user to completely disconnect their interaction with the relevant module or component processing the tap interaction to retarget the next step (e.g. tap) in the interface. Such can lead to errors in inputting and thus errors in or otherwise wasted operations by the device or system with which the device is communicating as the device and/or system processes that erroneous input.

It is understood that operations may not fall exactly within the modules 212-218 of FIG. 2 such that one module may assist with the functionality of another.

FIGS. 3-20 are diagrams illustrating example graphical user interfaces, in accordance with one or more aspects of the present disclosure. These GUIs may be generated by computing device 102 for output by gesture-based I/O device 104. FIGS. 3-10 illustrate a GUI for instructing an allocation comprising a money transfer of an allocation amount between an allocation source and an allocation destination.

Figure 3:
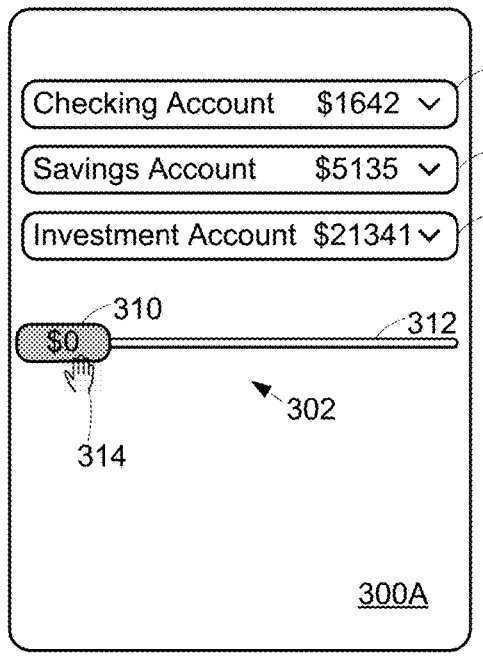
FIGS. 3-20 are diagrams illustrating example graphical user interfaces, in accordance with one or more aspects of the present disclosure.

FIG. 3 shows GUI 300A comprising a selectable linear slider control 302 displayed in an amount region of the screen of gesture-based I/O device 104 and a plurality of allocation regions 304-308 having associated accounts (e.g. a checking account, savings account and investment account) displayed in respective regions of gesture-based I/O device 104. Slider control 302 comprises a slider device 310 configured for movement along a line 312. Moving the slider device 310 in a first direction (e.g. to the right) increases an allocation amount associated with the slider control 302 and moving the slider device 310 in a second direction (e.g. to the left) decreases the amount. The amount may be displayed and updated such as within the slider device 310 as the amount is selected by movement of the slider device 310. FIG. 3 shows a representative illustration of a user hand 314 interacting with the slider device where the hand may represent a finger or pointer such as a stylus in contact with the screen of the gesture-based I/O device 104. A touch at a location on the screen of the slider device 310 may activate the slider device 310 for movement. Moving the finger or pointer along the direction of the line to the right in the example while still touching the screen about the slider device 310 moves the slider device 310 and increases the amount. It is understood that the slider may be oriented in a different direction about the screen of gesture-based I/O device 104.

FIGS. 22-27 described further herein below show an alternative GUI for inputting numerical data having one or more controls to define numerical data using a continuous swipe gestured. This manner of inputting numerical data may be used in place of slider control 302 to perform an allocation.

Figure 4:
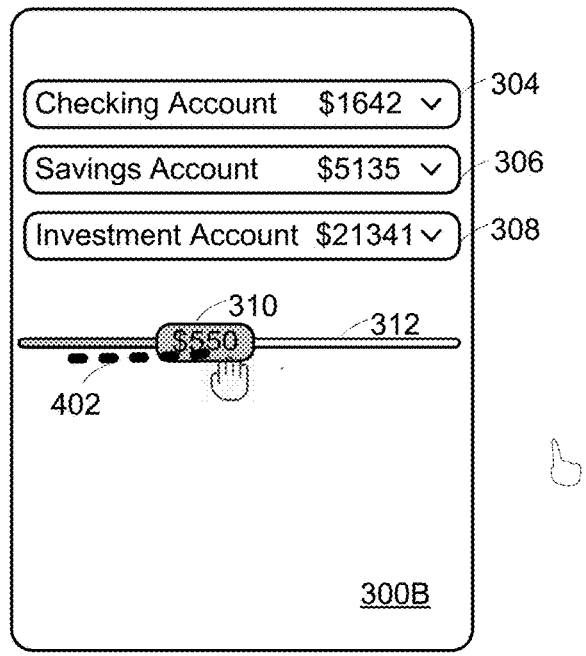

FIG. 4 shows GUI 300B following input of touch events moving the slider device 310 in a first direction along the line 312 where the amount is updated from $0 to $550. These touch events may define a first movement component of a single swipe gesture having two directions. The movement is illustrated for clarity by a dotted line 402, which ordinarily would not be shown in gesture-based I/O device 104.

Figure 5:
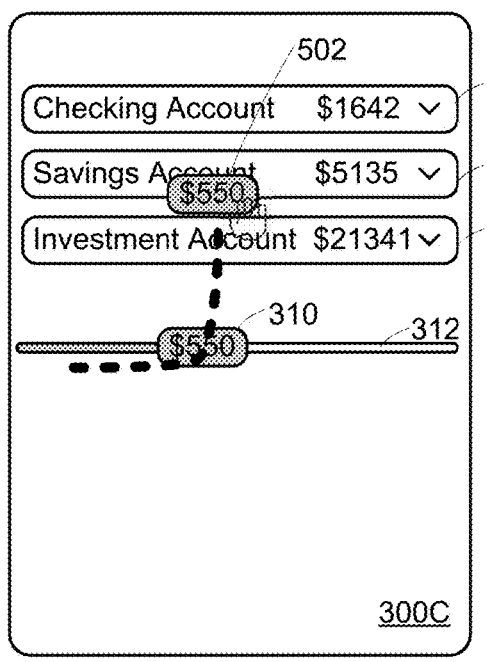
Figure 6:
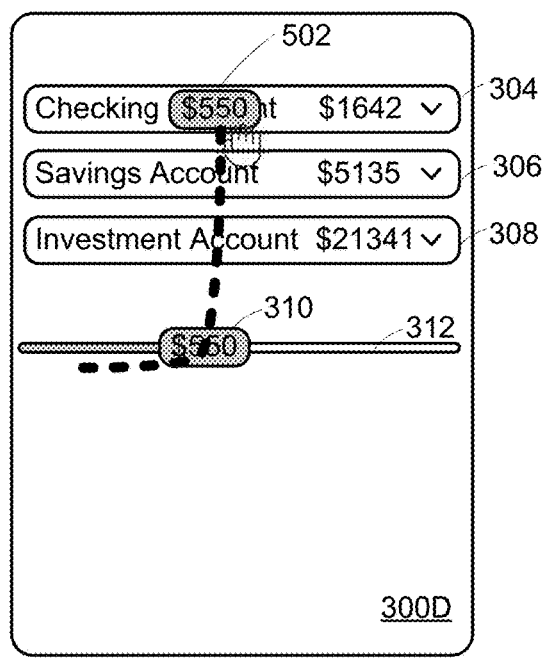
Figure 7:
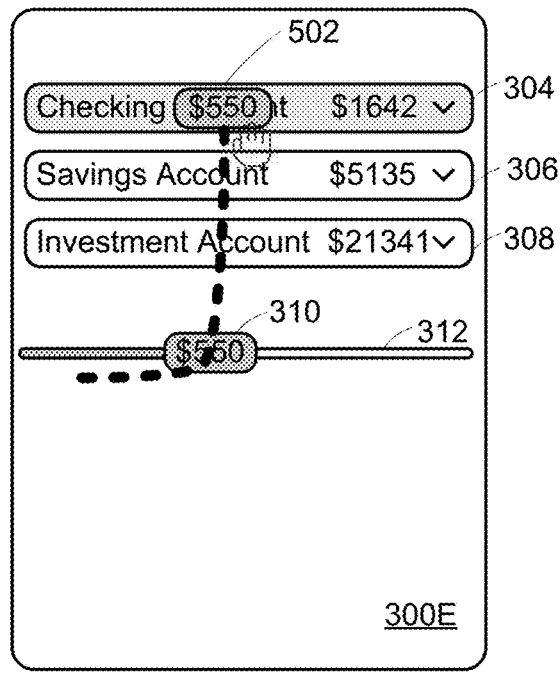

In accordance with the present example, and with respect to GUIs 300C and 300D of FIGS. 5 and 6, to instruct the allocation source for the allocation, the swipe gesture is continued in a second direction, away from the line 312 to one of the plurality of allocation regions associated with respective sources. GUI 300C shows the swipe passing over some of the plurality of allocation regions to the region 304 associated with the desired source (checking account). The movement is further illustrated by the continued dotted line. In the present example, a representation of the slider device 310 (e.g. a further instance thereof 502) displaying the selected allocation amount is displayed in response to the second movement component of the swipe, moving away from the line 312. The location of the second slider device 502 is updated as the movement progresses (e.g. responsive to the touch events).

A pause component, where movement of the finger/pointer (and hence slider device 502) is paused or held over the location of the allocation region 304 selects the associated account. As shown in GUI 300E of FIG. 7, the GUI may be updated to indicate the selection of the particular source (e.g. (checking account) such as by changing a colour or shade of the graphical element representing the allocation source at region 304. Other manners of visually representing the selection are possible.

Figure 8:
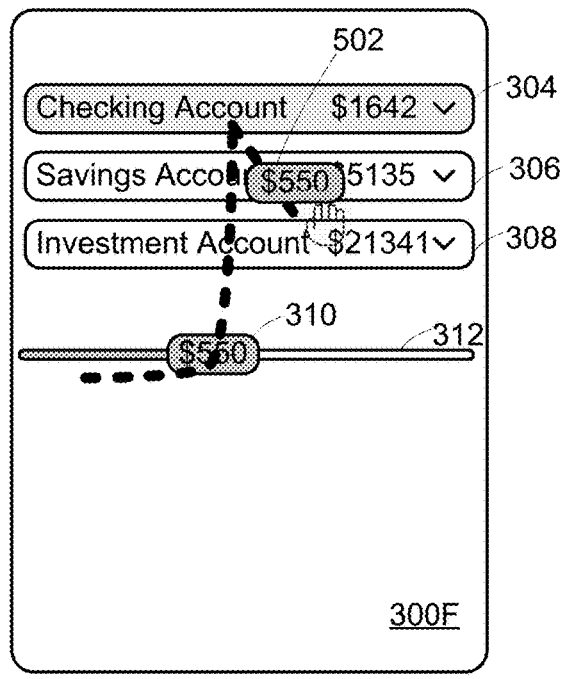
Figure 9:
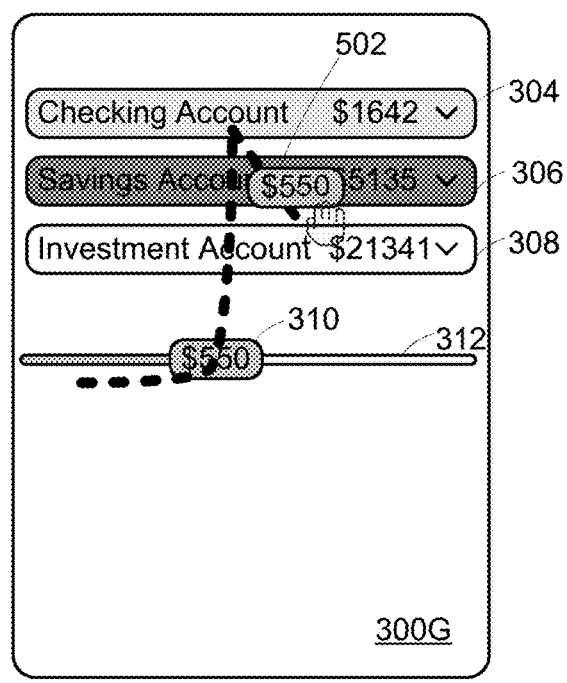
Figure 10:
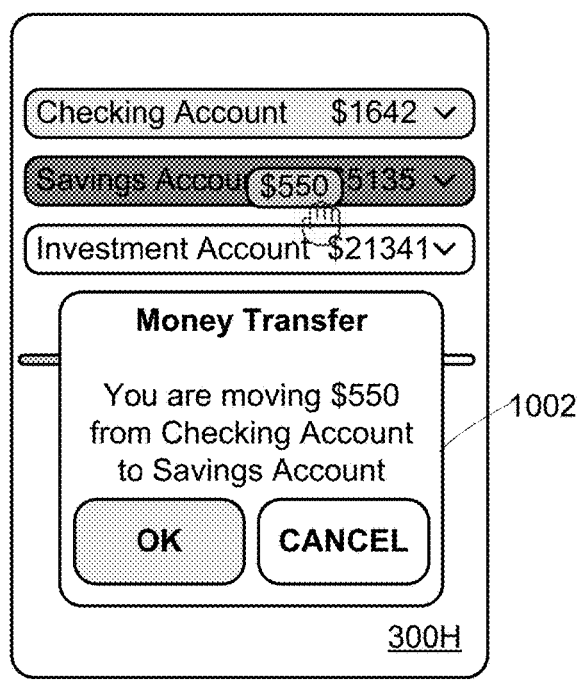

To instruct a destination account, a third movement component to move the finger/pointer to an allocation region is shown in GUI 300F of FIG. 8. Touch events are received (e.g. via gesture module 216) and the GUI 300F updated in response to move slider device 502. Similarly to FIGS. 6 and 7, pausing movement over one of the other accounts displayed in the GUI 300F selects the account as the allocation destination. This account selection may be noted by updating a colour or shade of the graphical element representing the account on the location of the screen (e.g. GUI 300G of FIG. 9). The slider device 502 may be moved and displayed in response to this third movement in a similar manner as previously described. FIG. 10 illustrates GUI 300H showing a confirmation dialog and control 1002 to approve or cancel the allocation instruction.

If the finger/pointer is lifted before completing the selection of the allocation destination, the lifting input terminates the continuous swipe gesture to cancel the allocation. The finger may be lifted before or after the selection of the allocation source for example. If after, the selection of the allocation source may be reset and the GUI updated accordingly. The allocation amount may remain or be reset and the GUI updated.

Following selection of one of the plurality of allocation sources associated to a respective account, the allocation regions displaying the other accounts are defined or treated as allocation destinations. The same accounts may be a source or a destination depending on the order in which they are chosen, for example, in accordance with the configuration of allocation module 212. It is also understood that some accounts may only be destination accounts such as for bill payments, transfers to individuals, etc. such that the accounts presented may differ after a source is selected. In other examples of allocation module 212, the destination account may be selected first. GUIs may be configured to display (or to output audibly) user instructions about which account is to be selected first.

Figure 11:
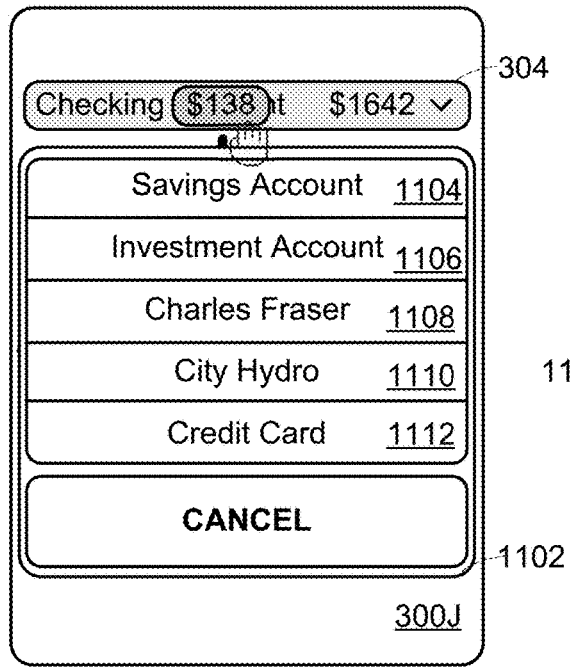
Figure 12:
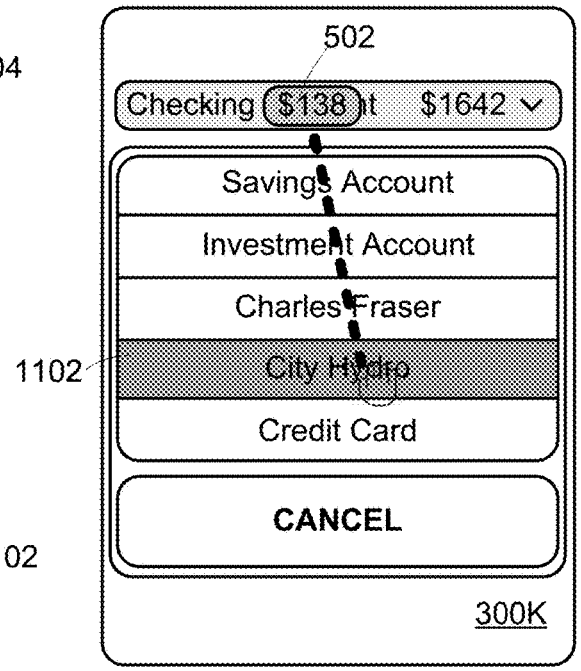

FIG. 11 shows GUI 330J in accordance with another example. In the present example, though not shown, a single swipe gesturer having two directions has been received relative to slider device 310 to select an amount of $138 and to move the second instance of the slider device 502 to select the source account 304.

Figure 13:
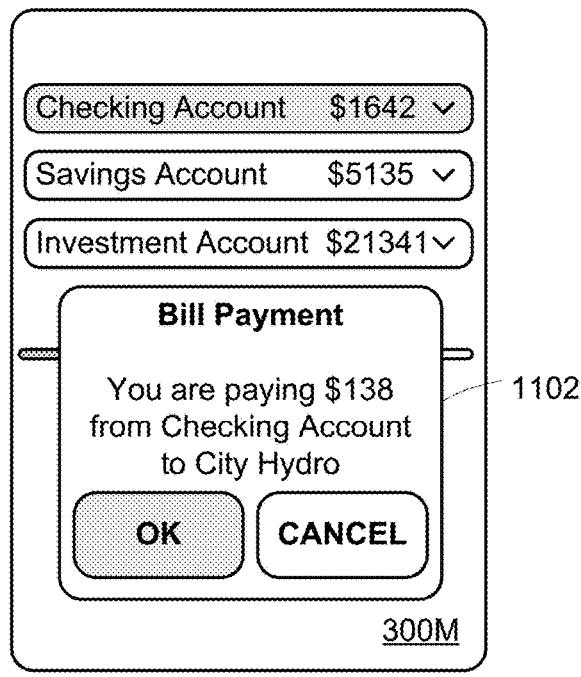

In the present example, which is different from GUIs 300E-300G, selection of the allocation source such as by pausing over the location on the screen invokes the display of a plurality of allocation destination regions 1104-1112 associated with respective destinations such as accounts, individuals, businesses, credit cards, etc. each having respective locations on the screen. The allocation destinations may be displayed in an overlay control 1102. A third movement component of the single swipe gesture may be received as touch events to move to select the desired destination. Pausing movement over the allocation region on the screen of gesture-based I/O device 104 selects the associated destination (e.g. 1202) as shown in GUI 300K of FIG. 12. In the present example, the desired destination is "City Hydro" reflecting a bill payment. In this example, slider device 502 is not updated in response to the movement but could be. Similarly in the other GUIs. Slider device 502 may not be employed or moved. FIG. 13 illustrates GUI 300M showing a confirmation dialog and control 1302 to approve or cancel the allocation instruction for the bill payment.

In a further example, movement to an allocation source (or destination) followed by a second level touch (e.g. force touch/sure click) may invoke the display of a longer list of allocation sources (or allocation destinations). The GUI for same may appear similar to GUI 300J of FIG. 11 for example.

Figure 14:
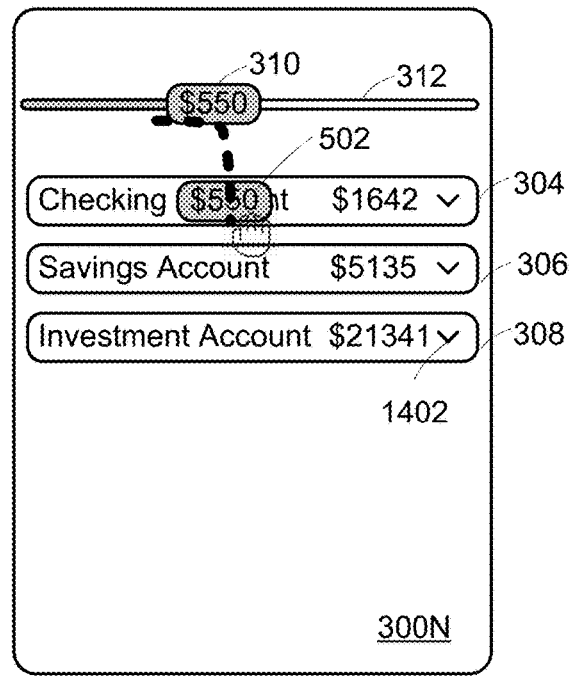

FIG. 14 shows GUI 300N, similar to GUI 300B but where the slider control is shown in a different region of the screen, above (top to bottom-wise, relative to the screen) the regions displaying the plurality of allocation sources 304, 306 and 308. A single swipe gesture having two directions is shown by the dotted line. It may be observed that the allocation source (or destinations) may be associated with association controls (e.g. 1502) which may be invoked such as by tapping the region of the screen where one of the controls 1502 is displayed to drop down a list of candidate accounts, people, businesses, credit cards, etc. for selection to define the association between the region on the screen and the selected candidate source or destination. In this way, for example, the user may configure the GUI to display favourite or regularly used accounts, people, etc. or to do so for a single occurrence.

Figure 15:
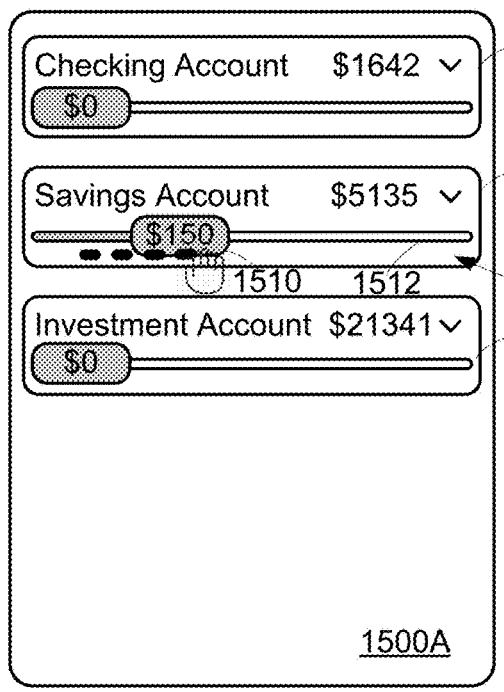

FIGS. 15-18 illustrate a money transfer allocation in accordance with a further example, transferring an amount from a source account to a destination account. FIG. 15 illustrates GUI 1500A having a plurality of allocation regions 1504-1508 associated with respective sources (e.g. accounts) and where each has a respective linear slider control (e.g. 1502) having a slide device (e.g. 1510) and line (e.g. 1512).

Figure 16:
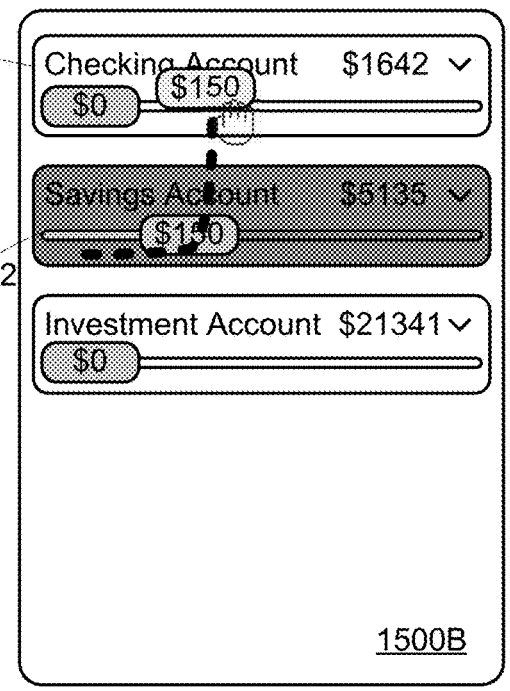
Figure 17:
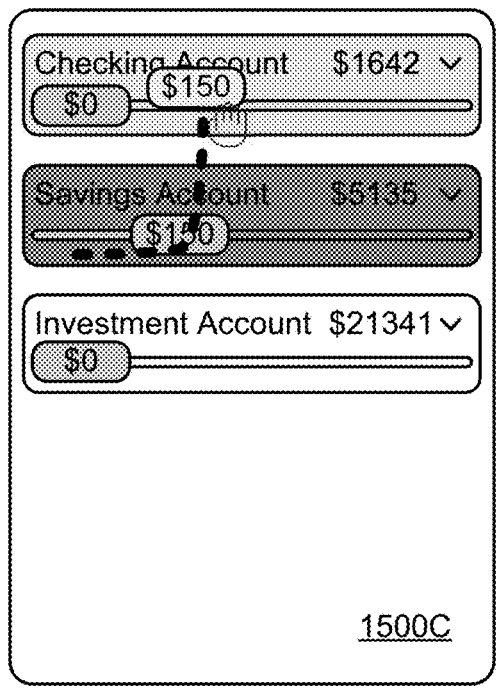
Figure 18:
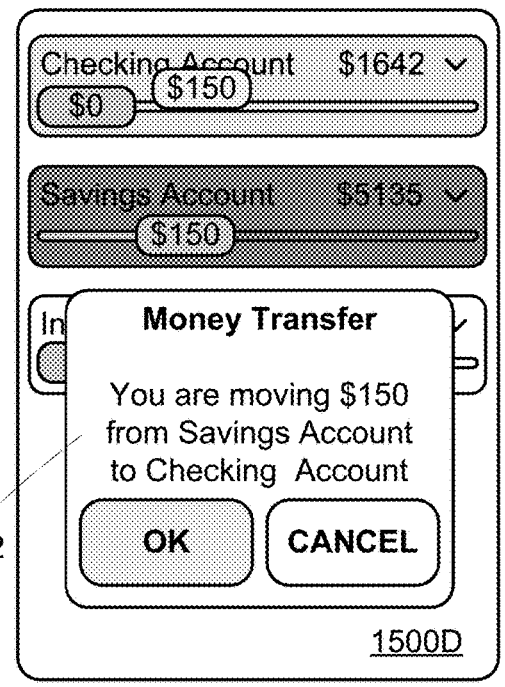

Selecting a particular slider control in a particular allocation region automatically selects the associated allocation source (account). Thereafter the other displayed allocation regions are defined as allocation destinations and the associated accounts treated accordingly. FIG. 16 illustrates GUI 1500B where a single swipe movement in two directions is shown. Similarly to the previous example, a first movement component of the swipe gesture in a first direction along the line (e.g. 1512) selects an amount ($150). A second movement away from the line to the allocation region 1504 associated with the checking account selects this account as the allocation destination such as following a pause movement over the allocation region (see GUI 1500C of FIG. 17). GUI 1500D of FIG. 18 illustrates a confirmation dialog and control 1802 to confirm the money transfer allocation instruction.

Figure 19:
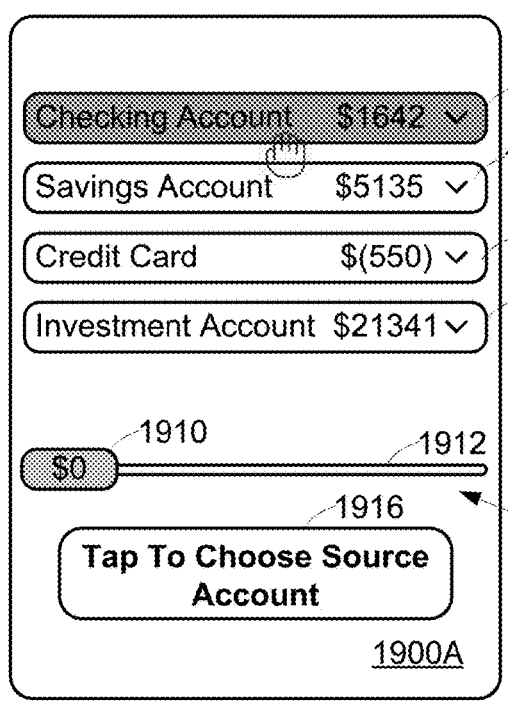
Figure 20:
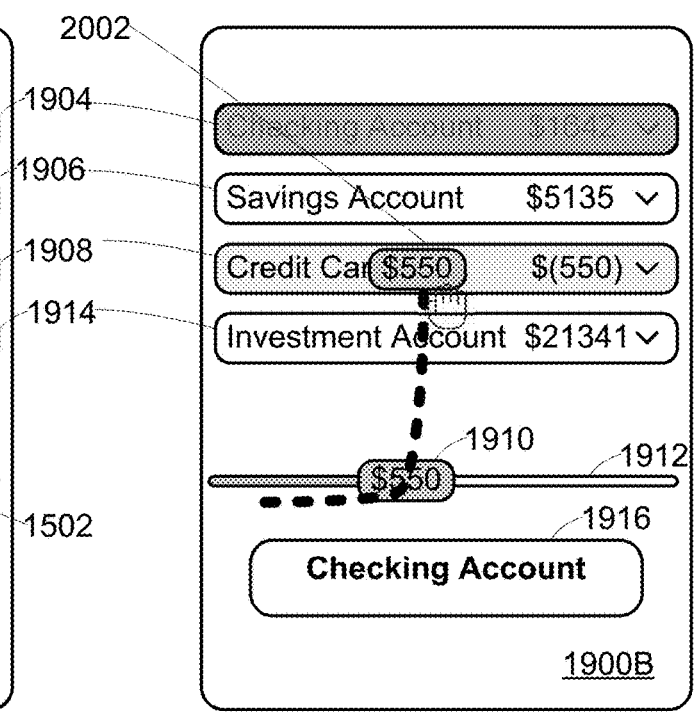

FIGS. 19-20 illustrate a further example interface where the single swipe gesture selects an allocation amount and an allocation destination, where the allocation source is selected in a different manner. GUI 1900A of FIG. 19 shows a plurality of allocation regions 1904, 1906, 1908 and 1914 associated with respective accounts. GUI 1900A further comprises a linear slider control 1902 having a slider device 1910 and a line 1912. A user instruction region 1916 display instructions with respect to selecting an allocation source such as by tapping an allocation region to select the associated source (account). Tapping may highlight (e.g. change a colour or shade) the allocation region 1904.

Selecting a particular allocation region automatically selects the associated allocation source (account). Thereafter the other allocation regions are defined as allocation destinations and the associated accounts treated accordingly. FIG. 20 illustrates GUI 1900B where a single swipe gesture in two directions is shown. Similarly to the previous examples in which a single swipe gesture is shown to select an amount and an allocation source or destination, a first movement component of the swipe gesture in a first direction along the line (e.g. 1912) selects an amount ($550). A second movement away from the line 1912 is directed to the allocation region 1908. This region is associated with a credit card as the allocation destination. A pause movement over the allocation region selects the allocation destination. The selection may be indicated by updating the allocation region 1908 (color or shading, etc.) Movement away from the line 1912 may be reflected as before, by displaying a second instance 2002 of slider device 1910 in response to the movement. To reflect that the selected source is not available to select as a destination, the allocation region 1904 may be updated such as by shading out the account. The allocation source selected in GUI 1900A may be displayed in GUI 1900B such as in instruction region 1916. Though not shown, tapping this region 1916 may enable a user to re-select the allocation source, for example, returning to GUI 1900A. To obtain more granular amounts using a slider control various operations may be performed. In one example, operations processing the swipe interaction with the slider control may determine the speed and acceleration of the swipe and use an operation to change the scale of the motion (i.e. the response to the swipe input) when changing the amount in a manner that is related to the speed/acceleration of the slide. For example, a user may receive a more granular scale to change the amount by smaller increments/decrements when slowing down and may receive a larger scale to change the amount by larger increments/decrements when moving fast over the same area of slider which allows for the inclusion of a very large scale over a very short slider bar. In another example, in response to a slowing down of the swipe, a stepped slider maybe presented. Slowing down provides a separate visual slider to do granular selection. In a further example, a second touch slide may be presented to receive input to control the granular scale for the user.

Figure 21:
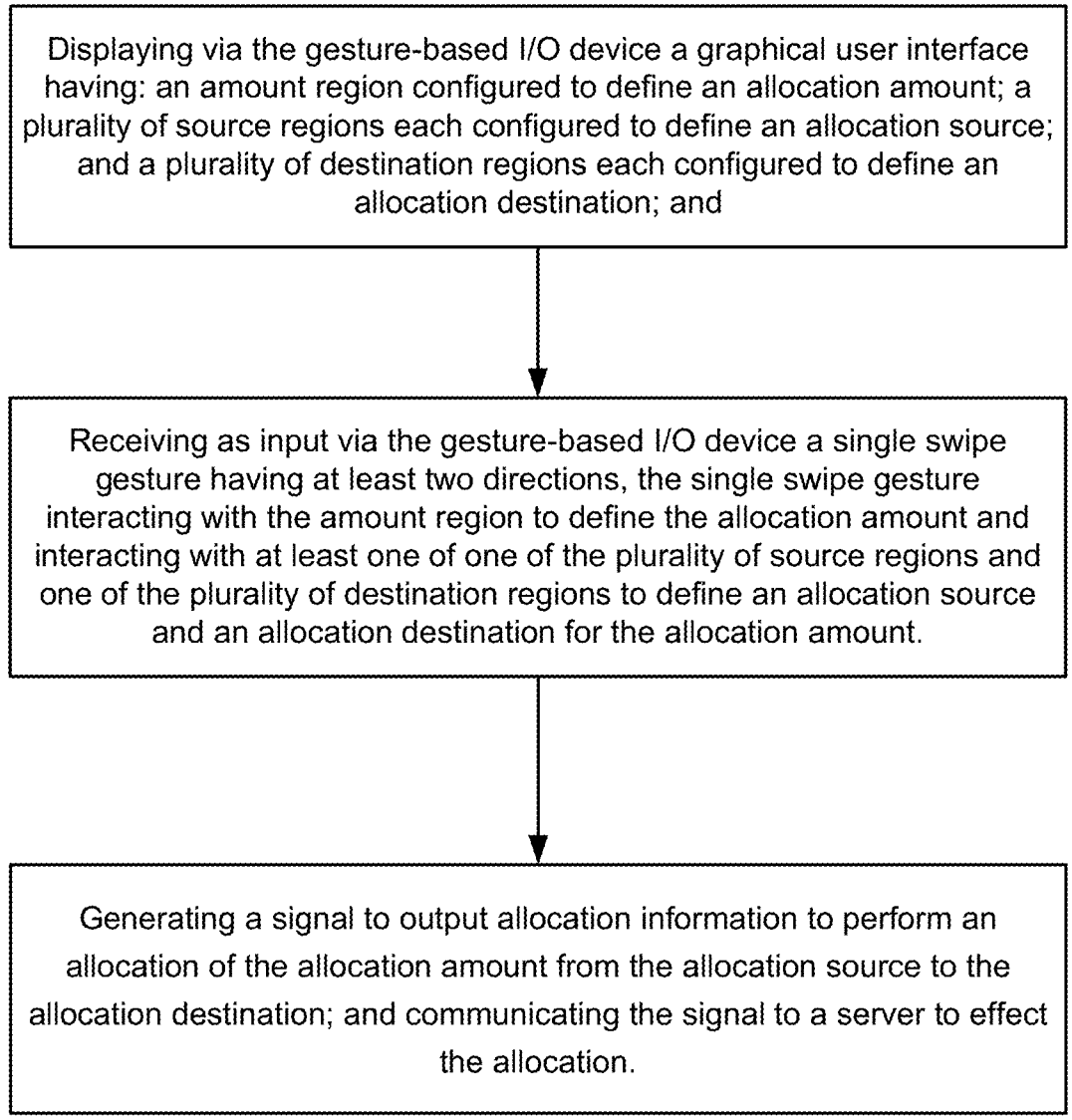
FIG. 21 is a flowchart illustrating an example operation of a computing device, in accordance with one or more aspects of the present disclosure.

FIG. 21 is a flowchart illustrating example operations 2100 of a computing device, in accordance with one or more aspects of the present disclosure. At 2102 operations display via the gesture-based I/O device (e.g. 104) a graphical user interface having: an amount region configured to define an allocation amount; a plurality of source regions each configured to define an allocation source; and a plurality of destination regions each configured to define an allocation destination. At 2102 the operations receive as input via the gesture-based I/O device a single swipe gesture having at least two directions, the single swipe gesture interacting with the amount region to define the allocation amount and interacting with at least one of one of the plurality of source regions and one of the plurality of destination regions to define an allocation source and an allocation destination for the allocation amount.

At 2104 operations generate a signal to output allocation information to perform an allocation of the allocation amount from the allocation source to the allocation destination. At 2106 operations communicate the signal to a server to effect the allocation.

It will be appreciated that in one aspect the teachings herein provide a method implemented by at least one processing device coupled to a memory and coupled to a gesture-based I/O device. The method comprises outputting a graphical user interface via the gesture-based I/O device, the graphical user interface comprising: a plurality of source regions and destination regions configured to define respective allocation sources and allocation destinations; and one or more amount regions configured to define an allocation amount, at least some of the amount regions displaying a respective linear slider control selectable for movement along a respective line within each of the at least some amount regions to define the allocation amount and for movement away from the line to select at least one of a particular source region and a particular destination region of the plurality of source regions and destination regions to respectively define an allocation source and/or allocation destination. The method further comprising receiving a single swipe gesture having at least two directions as input via the gesture-based I/O device, the single swipe gesture selecting and moving the respective linear slider control of one of the amount regions to define the allocation amount and moving to at least one of a particular source region and a particular destination region of the plurality of source regions and destination regions to define respectively at least one of the allocation source and the allocation destination. And outputting a signal, by the at least one processing device to a server, the signal comprising allocation information to perform an allocation of the allocation amount from the allocation source to the allocation destination In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Figure 22:
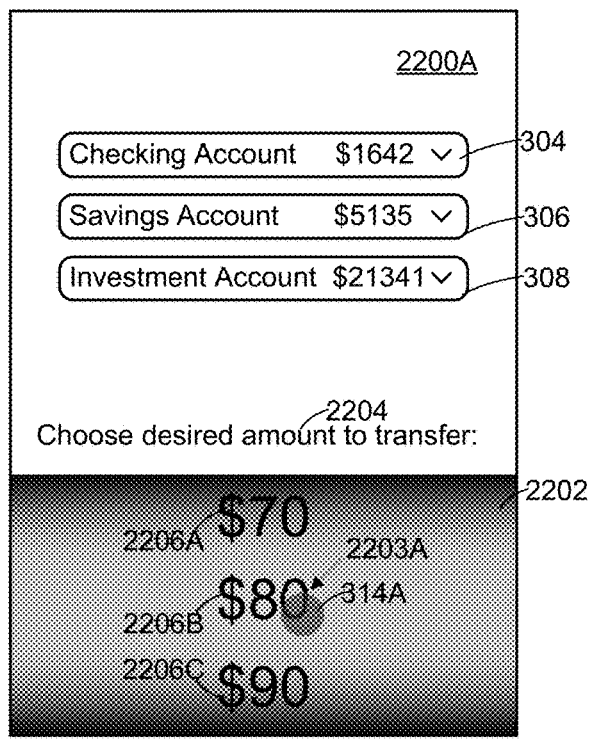
FIGS. 22-27 are diagrams illustrating example graphical user interfaces, in accordance with one or more aspects of the present disclosure.

FIGS. 22-27 are diagrams illustrating example graphical user interfaces, in accordance with one or more aspects of the present disclosure. FIG. 22 shows interface 2200A displaying an amount region for receiving gesture input to define a numerical amount (a number). The specific amount may be provided to perform an allocation such as described herein. A prompt 2204 may be displayed to assist. The amount region 2202 of the interface is configured to permit selection of a gross amount as an initial specific amount and then provides one or more finer amount controls for refining the specific amount. Often a desired specific amount to be input is specific to at least the ones digit of a whole number. For currency and other numerical inputs, a fraction (e.g., $\frac{1}{10}$, $\frac{1}{100}$, etc.) of a whole number may be desired to be specified. Defining a picker interface with sufficient specificity would require a user to scroll through many numbers to reach the desired number or scroll multiple pickers to pick each digit or group of digits of the number. Such a picker type of interface thus requires many discontinuous inputs.

In accordance with one aspect provided herein, a gross amount may be presented that is relatively close to the desired specific number to be input, for example so as to reduce the count of numbers to be presented by the picker interface or other interface (e.g. a slider). The gross number may be determined by the context of the input. For example in an allocation, amounts from the various potential sources (e.g. accounts 304, 306, 308) could be examined to determine the upper and lower limits and divided (e.g. into thousands, hundreds, tens, etc.) to determine the gross number. The gross number may be determined from specific user behaviour with the device (e.g. examining typical or average transactions) or from examining a wider group of users performing similar transactions. Context may be determined in other manners. Input numbers may have inherent upper and lower number constraints in the context of the task associated with the input. In any of the embodiments, an option may be provided for a user to use another input method.

Amount region 2202 comprises a gross amount control 2203A shown as a scrollable picker interface displaying (ordered) gross amounts 2206A, 2206B, 2206C. When scrolled using a gesture such as a swipe or flick, the gross amount control 2203A rotates (similar to a wheel) individual gross amounts for selection. A first gesture such as a hard press (click) of the gestural I/O device 104 (if so configured) or a pause (e.g. a touch or similar engagement of suitable duration) selects the gross amount. In the example, the gesture is illustrated by darker circle 314A similar to hand 314 in FIGS. 3-20.

Figure 23:
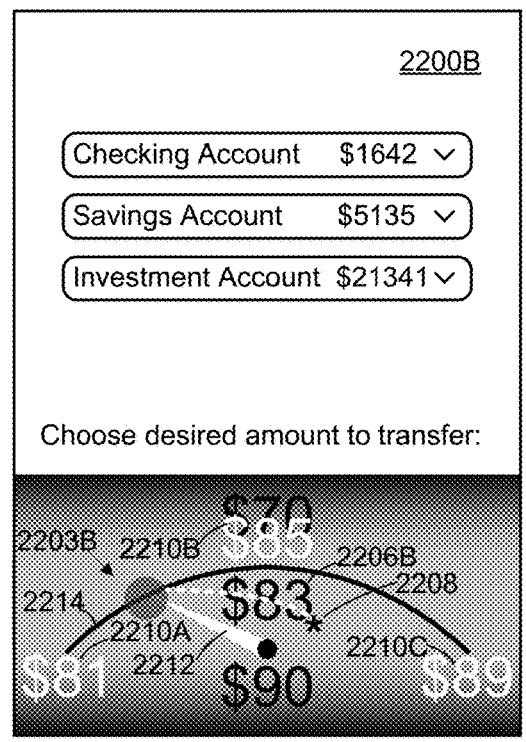

FIG. 23 shows interface 2200B presented in response to the first gesture 2208 and illustrated for convenience with an asterisk (*). This asterisk is for purposes of illustration and would not be indicated to a user in region 2202. Gesture 2208 invokes the presentation of a finer amount control 2203B to receive further gestural input, continuing the first gesture 2008 (i.e. without disengaging a touch screen of the gestural I/O device 104). Control 2203B may be displayed in association with graphical elements such as finer amounts which may include a lower limit 2210A, a middle limit 2210B and an upper line 2210C by which the specific amount may be refined. In the present embodiment, the finder amount control is a slider type whereby a needle (2012) is moved along a line (e.g. curved line) 2214 to input the specific amount with finer specificity. The specific amount may be updated and displayed (e.g. 2206B) in response to the movement. It will be understood that the quantum of the specific amount varies with the direction and distance of the movement (swipe gesture) along the control. The touch need not lift from the screen and the swipe is illustrated with broken line as shown in earlier illustrations.

Figure 24:
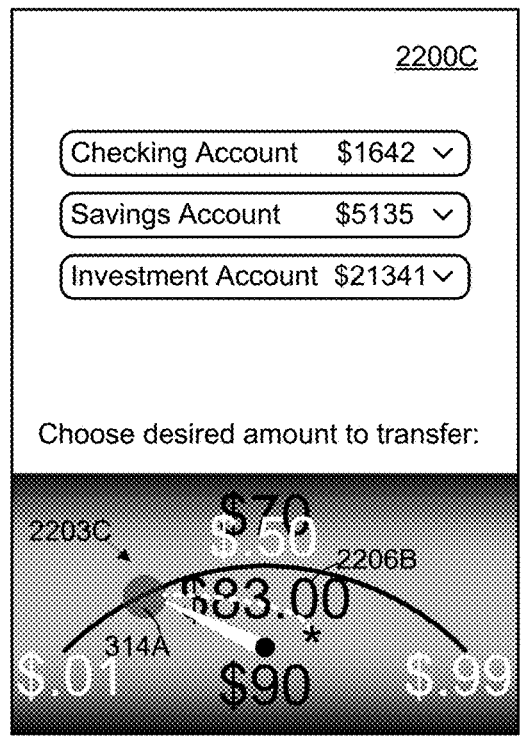
Figure 25:
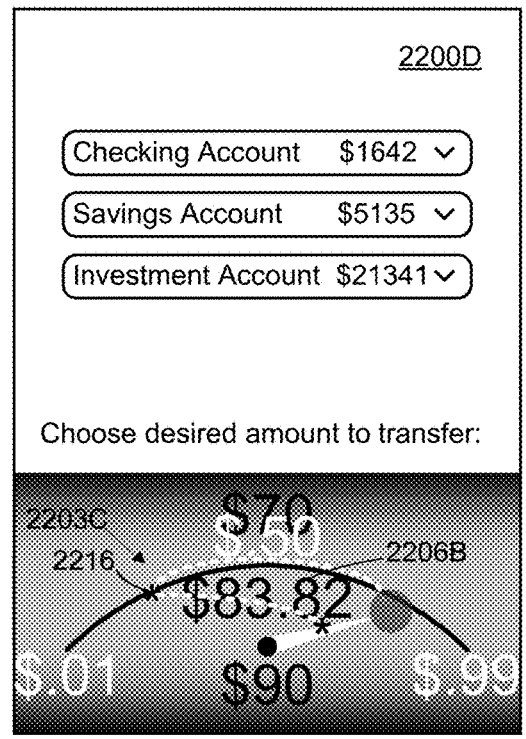

Once the desired specific amount is selected a second gesture may be made such as a hard press (click) or pause, continuing the same continuous swipe gesture to update the specific amount (e.g. $83). This second gesture may invoke yet a further finer amount control 2203C as shown in interface 2200C of FIG. 24. Control 2203C permits refinement of specific amount to input one hundredths. Though not shown a finer amount control may be present to input one tenths and then another provided for one hundredths. The specific amount 2206B may be shown with an initial hundredths amount (00). This amount may be accepted without movement of touch such as by a further hard click or pause (not shown). However, if a different amount is to be input finer amount control 2203C is similar in operation to control 2203B whereby the continuous swipe gesture adds on from the second gesture to move needle 2012 to a desired more specific amount 2204B as shown in FIG. 24. In FIG. 24, asterisk 2216 and the dotted line show the second gesture invoking the finer amount control and the continuous swipe movement to the new value. This new value may be set (whereby the amount is no longer changeable via the control 2203C) such as by a final gesture (hard click or pause). Though this may not be necessary.

Figure 26:
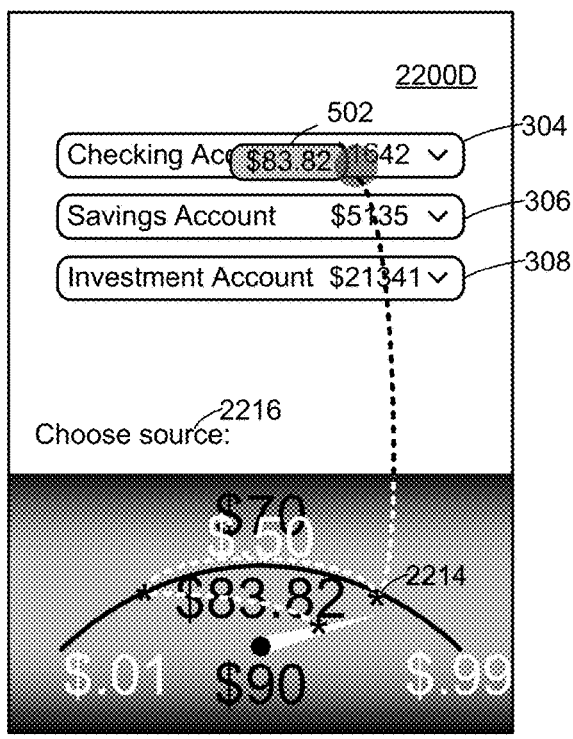

As shown in FIG. 26, following the final gesture (asterisk 2214) the swipe may continue to drag or move the specific amount to an allocation source (one of accounts 304, 306 or 308) as represented by the dotted line from asterisk 2214. The specific amount may be represented (502) as the swipe is input. A final gesture setting the amount may not be necessary, a gesture moving the amount away from the control may be sufficient to set (fix the amount). Operations for an allocation are discussed above.

In other embodiments, invoking a region of an interface where a numerical value is to be received, such as in a form presented by the interface, may invoke the presentation of amount region 2202 (or other number input region) to receive the specific amount (number). Once the amount (number) is set, the specific amount (number) may be shown as entered in the interface form where the numerical value is to be received.

It will be understood that for some numerical inputs the presently described manner of inputting finer numbers may not be ideal. Entering a credit card or payment account number is one example. A constrained number over a relatively small range (e.g. whole numbers between 1 and 100 (age or other amount data), 1 and 12 or 1 and 31 (e.g. date data), etc.) may also not be well suited to such input. Entering an number amount, particularly an amount of currency, is facilitated however especially when the amount could be any of many different values (quanta).

It will be understood that successive respective finer number controls may be presented to refine the specific number. A next of the respective finer number controls may be displayed in response to a respective hard click or pause gesture interacting with a one of the respective finer number controls as currently displayed. Each of the respective finer number controls refines the specificity of the specific number in response to a direction and distance of the continuous swipe.

Each finer number control may be a slider control interface to adjust the specific number between a lower limit at one end of the slider control interface and an upper limit at an opposite end of the slider control interface.

The specific number may be input as one continuous gesture where each respective hard click or pause gesture is a component of the continuous swipe gesture to continually interact with the gesture based I/O device to define the specific number.

The graphical user interface may be configured with a gestural control to receive a swipe gesture input to move the specific number to a receiving control which receives the specific number to assist with a completion of a GUI form. The GUI form may be a transaction form such as for an allocation of money (e.g. a payment or transfer, etc.) The swipe gesture input may be a component of the continuous swipe gesture which input the specific number.

Figure 27:
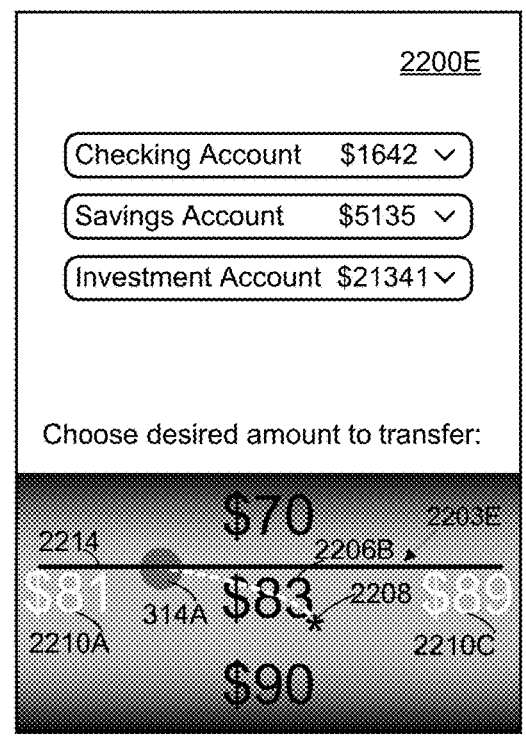

FIG. 27 shows an interface 2200E with an alternative representation of a fine amount control 2203E which may be used in any of the embodiments but which is shown as an alternate to interface 2200B. Finer amount control 2203E is displayed in association with a straight line graphical element 2214 rather than a curved line graphical element 2214 as shown in FIGS. 23-26 the respective finer amount controls. A needle graphical element is not shown in interface 2200E. In interface 2200E only lower amount 2210A and upper amount 2210C are presented (the middle amount being omitted).

Figure 28:
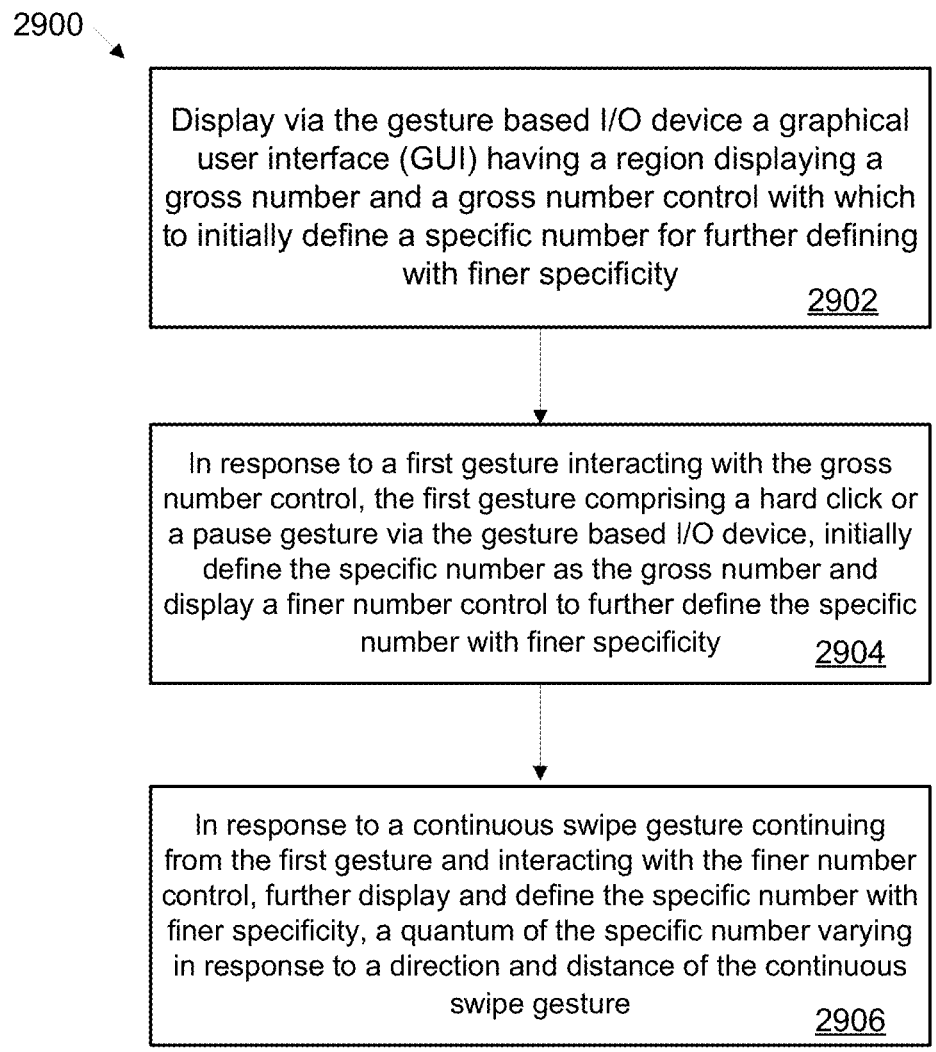
FIGS. 28 and 29 are respective flowcharts illustrating respective example operations of a computing device, in accordance with one or more aspects of the present disclosure.

FIG. 28 is a flowchart illustrating an example operation 2800 of a computing device such as device 102, in accordance with one or more aspects of the present disclosure. At step 2802 the computing device displays via its gesture based I/O device a graphical user interface (GUI) having a region displaying a gross number and a gross number control with which to initially define a specific number for further defining with finer specificity. At step 2204, in response to a first gesture interacting with the gross number control, the first gesture comprising a hard click or a pause gesture via the gesture based I/O device, the computing device initially defines the specific number as the gross number and displays a finer number control to further define the specific number with finer specificity.

At step 2206 in response to a continuous swipe gesture continuing from the first gesture and interacting with the finer number control, the computing device further displays and defines the specific number with finer specificity. The quantum of the specific number varies in response to a direction and distance of the continuous swipe gesture.

The finer number control may be responsive to a second hard click or pause gesture via the gesture based I/O device interacting with the finer number control to display a further finer granular number control to further define the specific number with further finer specificity. As such the computing device may be further configured to: in response to a continuation of the continuous swipe gesture from the second gesture and interacting with the further finer number control, further display and define the specific number with further finer specificity. The quantum of the specific number again varies in response to a direction and distance of the continuous swipe gesture. The further finer number control may be responsive to a third hard click or pause gesture via the gesture based I/O device to set the specific number. The finer number control may be configured to adjust the specific number between an upper number and a lower number relative to the gross number.

The finer number control may include a slider control interface to adjust the specific number between a lower limit at one end of the slider control and an upper limit at an opposite end of the slider control. The slider control interface comprises a graphical element displayed in association with the lower limit and upper limit to visually guide the continuous swipe gesture.

The graphical user interface may be configured with a gestural control to receive a swipe input moving the specific number to a receiving control which receives the specific number to assist with a completion of a GUI form (e.g. see FIG. 26). The swipe input may be a component of the continuous swipe gesture.

Figure 29:
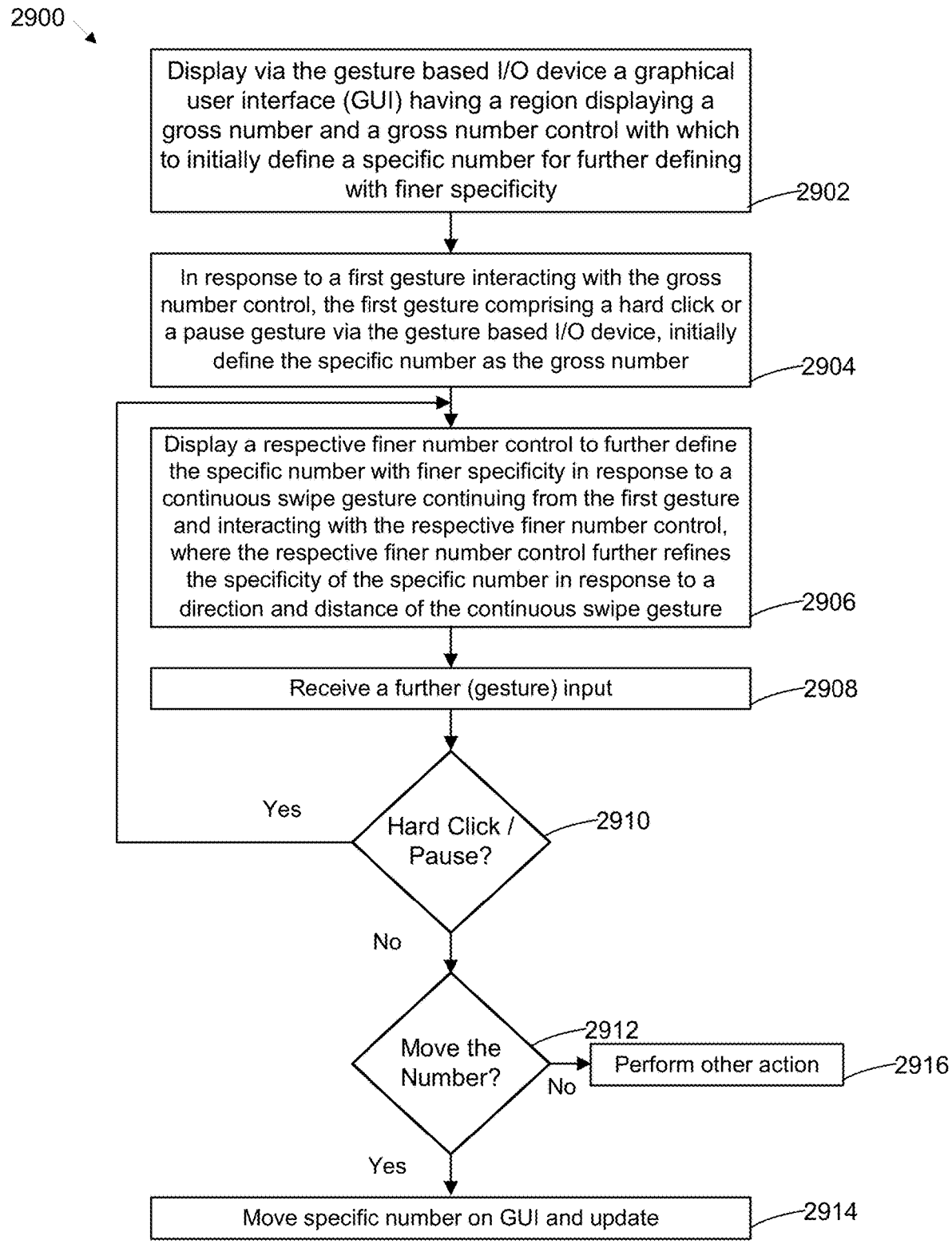

While FIGS. 22-28 show and discuss two finer controls to further refine the gross number, a greater or lesser plurality of finer controls may be presented, for example in a successive manner after displaying the gross number, each refining one or more digits of the specific number relative to the gross number. Each next finer control may be invoked by a hard click or pause gesture interacting with the finer control that is currently displayed. When the specific number is specified it may be moved such as via a swipe gesture to a receiving control to update a GUI form as described. FIG. 29 is a flowchart showing an example operation 2900 of a computing device (e.g. 102). It is a generalization of the operations 2800 that may apply to greater (or fewer) refinements. At step 2902, the computing device displays via its gesture based I/O device a graphical user interface (GUI) having an number region displaying a gross number and a gross number control with which to initially define a specific number for further defining with finer specificity;

At step 2904, in response to a first gesture interacting with the gross number control, the first gesture comprising a hard click or a pause gesture via the gesture based I/O device, the computing device initially defines the specific number as the gross number.

At step 2906, the computing device displays a (respective) finer number control to further define the specific number with respective finer specificity in response to a continuous swipe gesture continuing the first gesture. The respective finer number control refines the specificity of the specific number in response to a direction and distance of the continuous swipe interacting with the respective finer number control.

A next of the respective finer number controls may be displayed in response to a respective hard click or pause gesture interacting with a one of the respective finer number controls as currently displayed. Thus at step 2908 a further input which may be a gesture is received. At step 2910 a determination is made whether this is a hard click or pause gesture. If so, via yes branch from step 2910 operations may return to step 2906 to display a further respective finer number control. If no, operations proceed to step 2912. The gesture may be a move of the number such as via a (continued) swipe gesture that moves the number away from the finer number control. That is, as per the examples of FIGS. 22-27, moves the number not along the slider control but away such as generally perpendicular to the finer number control. If the gesture is a move of the specific number, via yes branch from 2912, operation at step 2914 moves the number and updates the GUI. The move gesture may interact with a receiving control to update a GUI form with the specific number (not shown in FIG. 29).

If at step 2912 the gesture (i.e. input) is not a move of the number it may be another gesture and appropriate action may be taken (not specified) via no branch to step 2916. For example, a gesture (input) cancelling the number specifying operations may be received.

It will be understood that the features and functions described with respect to FIGS. 22-27 may apply to operation 2900. For example, each respective hard click or pause gesture is a component of the continuous swipe gesture to continually interact with the gesture based I/O device to define the specific number. The specificity of the specific number to be defined is to at least ¹/₁₀₀ (one hundredths) decimal place. The graphical user interface may be further configured with a gestural control to receive a swipe gesture input to move the specific number to a receiving control which receives the specific number to assist with a completion of a GUI form. The GUI form is a transaction form, such as one involving a payment or movement of a currency (fiat or otherwise) value. The swipe gesture input to move the number is a component of the continuous swipe gesture that defines (sets) the specific number.

It will be understood that the description and figures show a number of aspects. In some aspects there is disclosed a system, method and computer readable medium provide a gesture-based graphical user interface to determine allocation information to instruct an allocation. A gesture-based I/O device displays a graphical user interface having: an amount region configured to define an allocation amount; a plurality of source regions each configured to define an allocation source; and a plurality of destination regions each configured to define an allocation destination. Input is received via the gesture-based I/O device as a single swipe gesture having at least two directions. The single swipe gesture interacts with the amount region to define the allocation amount and interacts with at least one of one of the plurality of source regions and one of the plurality of destination regions to define an allocation source and an allocation destination for the allocation amount.

There is disclosed a computing device having a processor coupled to a memory and coupled to a gesture-based input/output (I/O) device, the memory storing instructions, which when executed by the processor, configure the computing device to: display via the gesture-based I/O device a graphical user interface having: an amount region configured to define an allocation amount; a plurality of source regions each configured to define an allocation source; and a plurality of destination regions each configured to define an allocation destination; and receive as input via the gesture-based I/O device a swipe gesture having at least two directions, the swipe gesture interacting with the amount region to define the allocation amount and interacting with at least one of: (i) a source region of the plurality of source regions and (ii) a destination region of the plurality of destination regions to define an allocation source and an allocation destination for the allocation amount.

The swipe gesture may be a single swipe gesture. The computing device may be further configured to: generate a signal to output allocation information to perform an allocation of the allocation amount from the allocation source to the allocation destination; and communicate the signal to a server to effect the allocation.

The computing device may be configured such that: the amount region may display a selectable linear slider control for movement along a line to variably define the allocation amount; the swipe gesture comprises a plurality of connected consecutive swipe components including at least two movement components; a first movement component of the plurality of consecutive connected swipe components defines the allocation amount, the first movement component moving in a first direction to interact with the selectable linear slider control for movement along the line; and a second movement component, after the first movement component, defines the allocation source or the allocation destination, the second movement component moving in a second direction away from the line to the source region or the destination region. The computing device may be further configured to: responsive to the first movement component: display via the gesture-based I/O device a slider device of the selectable linear slider control to simulate movement along the line; raise or lower the allocation amount; and display via the gesture-based I/O device the allocation amount; and responsive to the second movement component: display via the gesture-based I/O device a second slider device to simulate movement in accordance with the movement away from the line; and determine the allocation source or allocation destination as selected by the second movement component. The computing device may be configured such that the plurality of consecutive swipe components further comprises respective pause components, pausing movement to interact with at least one of the source region and the destination region to respectively define the allocation source and allocation destination. The computing device may be configured such that the second movement component defines the allocation source; and the plurality of connected consecutive swipe components comprises a third movement component after the second movement component, the third movement component moving from the source region to the destination region to define the allocation destination.

The computing device may be configured such that: the gesture-based I/O device displays a plurality of amount regions each configured to define an allocation amount; each of the plurality of amount regions displaying a respective selectable linear slider control for movement along a respective line; the plurality of amount regions are associated with respective ones of the plurality of source regions; the swipe gesture comprises a plurality of consecutive swipe components including at least two movement components; a first movement component of the plurality of consecutive swipe components selects one respective selectable linear slider control thereby selecting the source region to define the allocation source, the first movement component moving in a first direction to interact with the one respective selectable slider control for movement along the respective line to define the allocation amount; and a second movement component, after the first movement component, of the plurality of consecutive swipe components defines the allocation destination, the second movement component moving in a second direction away from the respective line to the destination region. The computing device may be further configured to: responsive to the first movement component: display via the gesture-based I/O device a slider device of the one respective selectable linear slider control to simulate movement along the line; raise or lower the allocation amount; display via the gesture-based I/O device the allocation amount for display; and responsive to the second movement component: display via the gesture-based I/O device a second slider device to simulate movement away from the respective line; and determine the allocation destination as selected by the second movement component to the destination region. The computing device may be configured such that the plurality of consecutive swipe components comprises a pause component pausing movement to interact with the destination region to define the allocation destination.

The computing device may be configured such that the swipe gesture comprises a plurality of consecutive swipe components including movement components and pause components and the computing device is configured to display via the gesture-based I/O device the plurality of destination regions following a pause component interacting with the source region which defines the allocation source.

The gesture-based input/output device may be a touch sensitive display screen device.

There is disclosed a method implemented by a computing device having a processor coupled to a memory and coupled to a gesture-based input/output (I/O) device, the method comprising: displaying via the gesture-based I/O device a graphical user interface having: an amount region configured to define an allocation amount; a plurality of source regions each configured to define an allocation source; and a plurality of destination regions each configured to define an allocation destination; and receiving as input via the gesture-based I/O device a swipe gesture having at least two directions, the swipe gesture interacting with the amount region to define the allocation amount and interacting with at least one of (i) a source region of the plurality of source regions and (ii) a destination region of the plurality of destination regions to define an allocation source and an allocation destination for the allocation amount.

Various embodiments of the invention have been described. These and other embodiments are within the scope of the following claims.

What is claimed is:

1. A computing device having a processor coupled to a memory and coupled to a gesture based I/O device, the memory storing instructions, which when executed by the processor configure the computing device to:
    display via the gesture based I/O device a graphical user interface (GUI) displaying:
        a gross number control with which to initially define a specific number from a gross number for further defining with finer specificity; and
        a finer number control to further define the specific number with the finer specificity;
    wherein the gross number control is configured to adjust the specific number between a gross upper number and a gross lower number in a plurality of equal gross increments therebetween and the finer number control is configured to adjust the specific number, in a plurality of equal fine increments, between an upper number and a lower number relative to the specific number, where the range between the upper number and lower number is less than one gross increment; and
    wherein the gross number control is responsive to a first gesture, via the gesture based I/O device, to define the specific number and the finer number control is responsive to a continuous swipe gesture, continuing from the first gesture, to define the specific number with the finer specificity.

2. The device of claim 1 wherein the finer specificity of the specific number varies in response to a direction and distance of the continuous swipe gesture.

3. The device of claim 1 wherein the displaying of the finer number control is responsive to defining the specific number using the gross number control.

4. The device of claim 1 wherein the first gesture comprises a hard click or a pause gesture.

5. The device of claim 1 wherein the finer number control is responsive to a second gesture component of the continuous swipe gesture interacting with the finer number control to display a further finer number control to further define the specific number with further finer specificity;
    and wherein the computing device is further configured to:
        in response to a continuation of the continuous swipe gesture from the second gesture and interacting with the further finer number control, further display and define the specific number with further finer specificity, the quantum of the specific number varying in response to a direction and distance of the continuous swipe gesture;
    wherein the further finer number control is configured to adjust the specific number in a plurality of equal further finer increments to further define the specific number relative to the specific number defined by the finer number control and where one further finer increment is less than one fine increment.

6. The device of claim 1 wherein the gross number control defines only a whole number value component of the specific number and wherein the finer number control defines only a fractional number value of the specific number.

7. The device of claim 1 wherein the finer number control includes a slider control interface to adjust the specific number between a lower limit at one end of the slider control and an upper limit at an opposite end of the slider control, where the lower limit is defined as the gross number plus one fine increment and the upper limit is defined as the gross number plus one gross increment and less one fine increment.

8. The device of claim 7 wherein the slider control interface comprises a graphical element displayed in association with the lower limit and upper limit to visually guide the continuous swipe gesture.

9. The device of claim 1 wherein the graphical user interface is configured with a gestural control to receive a swipe gesture input moving the specific number to a receiving control which receives the specific number to assist with a completion of a GUI form.

10. The device of claim 9 wherein the swipe gesture input is a component of the continuous swipe gesture.

11. The device of claim 1 wherein the gross number control defines the specific number from an initial gross number displayed by the gross number control.

12. A computing device having a processor coupled to a memory and coupled to a gesture based I/O device, the memory storing instructions, which when executed by the processor configure the computing device to:
    display via the gesture based I/O device a graphical user interface (GUI) displaying:
        a gross number control with which to initially define a specific number from a gross number for further defining with finer specificity; and
        a finer number control to further define the specific number with finer specificity;
    define the specific number responsive to a first gesture interacting with the gross number control; and
    successively display respective finer number controls to further define the specific number with respective finer specificity in response to a continuous swipe gesture continuing the first gesture; and
    wherein the gross number control is configured to adjust the specific number between a gross upper number and a gross lower number in a plurality of gross increments therebetween and each respective finer number control is configured to adjust the specific number, in a respective plurality of finer increments, between an upper number and a lower number relative to the gross number, where the range between the upper number and lower number is less than one gross increment.

13. The device of claim 12, wherein:
    a next of the respective finer number controls is displayed in response to a respective hard click or pause gesture interacting with a one of the respective finer number controls as currently displayed; and each of the respective finer number controls refines the specificity of the specific number in response to a direction and distance of the continuous swipe interacting with the respective finer number control.

14. The device of claim 13 wherein the each respective hard click or pause gesture is a component of the continuous swipe gesture to continually interact with the gesture based I/O device to define the specific number.

15. The device of claim 12 wherein each respective finer number control includes a slider control interface to adjust the specific number between a lower limit at one end of the slider control interface and an upper limit at an opposite end of the slider control interface.

16. The device of claim 12 wherein the specificity of the specific number to be defined is to at least 1/100 (one hundredths) decimal place.

17. The device of claim 12 wherein the graphical user interface is further configured with a gestural control to receive a swipe gesture input to move the specific number to a receiving control which receives the specific number to assist with a completion of a GUI form.

18. The device of claim 17 wherein the GUI form is a transaction form.

19. The device of claim 17 wherein the swipe gesture input is a component of the continuous swipe gesture.

20. A method implemented by a computing device having a processor coupled to a memory and coupled to a gesture based I/O device, the method comprising:
   displaying via the gesture based I/O device a graphical user interface (GUI) displaying:
      a gross number control with which to initially define a specific number from a gross number for further defining with finer specificity; and
      a finer number control to further define the specific number with finer specificity;
   defining the specific number responsive to a first gesture interacting with the gross number control; and
   successively displaying respective finer number controls to further define the specific number with respective finer specificity in response to a continuous swipe gesture continuing the first gesture;
   wherein the gross number control is configured to adjust the specific number between a gross upper number and a gross lower number in a plurality of gross increments therebetween and each respective finer number control is configured to adjust the specific number, in a respective plurality of finer increments, between an upper number and a lower number relative to the gross number, where the range between the upper number and lower number is less than one gross increment.

21. The method of claim 20 wherein each respective finer number control includes a slider control interface to adjust the specific number between a lower limit at one end of the slider control interface and an upper limit at an opposite end of the slider control interface.

22. The method of claim 20 wherein:
   a next of the respective finer number controls is displayed in response to a respective hard click or pause gesture interacting with a one of the respective finer number controls as currently displayed; and
   each of the respective finer number controls refines the specificity of the specific number in response to a direction and distance of the continuous swipe.

23. The method of claim 22 wherein the each respective hard click or pause gesture is a component of the continuous swipe gesture to continually interact with the gesture based I/O device to define the specific number.

24. The method of claim 20 wherein the graphical user interface is configured with a gestural control to receive a swipe gesture input to move the specific number to a receiving control which receives the specific number to assist with a completion of a GUI form.

25. The method of claim 20 wherein the swipe gesture input is a component of the continuous swipe gesture.

* * * * *